Oct. 1, 1968    P. B. THOMPSON    3,404,218
WELDABLE HIGH VOLTAGE TERMINAL
Filed Dec. 21, 1966
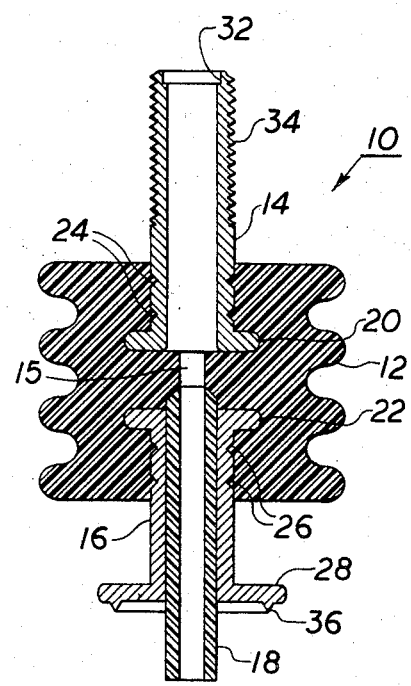

United States Patent Office 3,404,218
Patented Oct. 1, 1968

3,404,218
WELDABLE HIGH VOLTAGE TERMINAL
Philip B. Thompson, Pownal Center, Vt., assignor to Sprague Electric Company, North Adams, Mass., a corporation of Massachusetts
Filed Dec. 21, 1966, Ser. No. 603,538
1 Claim. (Cl. 174—177)

ABSTRACT OF THE DISCLOSURE

The terminal is provided by a generally cylindrical bushing of organic polymeric material having extended metal inserts whose diameters within the bushing are less than two-thirds that of the adjacent bushing and at least one of which has a weldable flange at the extended end thereof.

Background of the invention

The present invention relates to high voltage terminals and more particularly to weldable high voltage terminals.

Generally costly ceramic to metal seals, employed in the construction of high voltage terminals and stand-offs for use with capacitors and other electrical components, provide increased cost and are subject to accidental breakage and thermal shock. Other types of construction such as the use of plastic bushings have been employed, however, these generally provide inadequate seals which will not withstand the heat cycling resulting from the conventional soldering of the terminal to the component casing or other substantial temperature deviations encountered in production processes.

Summary of the invention

A high voltage terminal provided in accordance with the invention comprises a substantially cylindrical body of organic polymeric material having a metal insert at each end thereof. Portions of the inserts within the body are less than two-thirds the diameter of the adjacent body so that mechanical stress of the bushing-insert seal due to unequal heating is reduced, and at least one of the inserts is extended from the bushing and includes a weldable flange at the extended end which minimizes the thermal input usually encountered in mounting the terminal.

In the preferred embodiment, the insert diameter within the bushing is less than one-half the adjacent bushing diameter, and an axially extended projection is included on the flange to permit resistance welding of the terminal to its component casing.

It is an object of this invention to provide an economical high volage terminal having an organic polymeric bushing.

It is another object of this invention to provide a high voltage terminal having means of attachment to a component casing or other support which provides low thermal stress of the bushing.

Brief description of the drawing

The drawing illustrates a view in section of a high voltage terminal provided in accordance with the invention.

Description of the preferred embodiment

The high voltage terminal 10, illustrated in the drawing, is constructed with a substantially cylindrical bushing 12, of electrically non-conducting material, molded or formed around the metal inserts 14 and 16 which extend from each end.

The bushing 12 is made of organic polymeric material, such as polyolefins, epoxies, phenolformaldehyde resins, etc. which have satisfactory rigidity, high dielectric constant and a linear coefficient of expansion close to that of the metal inserts 14 and 16. For example, a glass reinforced phenolic or epoxy compound is suitable for use with many steel alloys. In addition, the plastic material must also be compatible with the environment or materials with which it may come in contact during assembly of the component and throughout its life.

As in conventional high voltage terminals, the fluted diameter of bushing 12 is employed to lengthen the leakage path over the external bushing surface, and a communicating passageway 15 is included within the bushing between inserts 14 and 16 to permit an internal connection from the component to insert 14.

Inserts 14 and 16 are made of conductive material such as nickel, or steel, or the like, however, steel is preferred since its coefficient of expansion is close to the described phenolic and epoxy compounds. The inserts are generally cylindrical in shape and have enlarged diameters 20 and 22 to secure them within bushing 12. Circumferential grooves 24 and 26 are also provided on the shafts 14 and 16 respectively, to enhance the seal to the plastic body 12. It should be understood, of course, that the lips 20 and 22 and grooves 24 and 26 may be employed separately, in combination, or with other means which aid in fastening the inserts.

For corona considerations, high voltage points, sharp corners, and the like are to be avoided within the bushing. Thus, as shown, a large radius should be provided on all insert corners within the bushing; or corona shields or the like should be suitably employed.

Insert 16 is provided with a flange 28 at its extended end for welding of the terminal to a component casing, or other support (not shown). An insulative tube 18 extends through insert 16 and serves to insulate the electrical conductor which is later passed through and connected to stud 14.

The insulative sleeve 18 which extends beyond flange 28 may be of any material having high dielectric strength, since it is not necessary that it be sealed to the insert. Thus, the sleeve may be the same material as the bushing, or other organic polymeric material, or any material having high dielectric strength which is molded or joined within the insert during construction of the terminal.

Other variations are also possible. For example, sleeve 18 may be an extension of bushing 12, or may be a separate tube which is preformed and inserted during construction of the terminal or before joining the terminal to the component.

In this embodiment, insert 14 carries, at its extended end, a recess 32 to which the component lead may be soldered, for example in arangement with a suitable washer, to connect and seal off this insert. An external thread 34 is also included for connection of the high voltage terminal to external circuitry.

The diameters of the embedded shafts of both inserts, that is portions within the bushing including lips 20 and 22, are made less than two-thirds the diameter of the adjacent bushing so as to reduce mechanical stress and avoid rupturing the bushing-insert seal due to thermal stress of the terminal; the latter, which may well occur at various times during construction and use of the component is of course most pronounced during assembly of the terminal to the component casing or other support.

Assuming that the thermal expansion coefficients of both bushing and insert (for example epoxy and steel) are well matched over the expected temperature range, stress of the bushing-insert joint will still often occur due to non-uniform heating of the terminal, such as when connection is made to the inserts. This stress is reduced by keeping the insert diameter small as compared to the bushing, so that the overall thermal expansion of the insert is limited to a reasonable value. As indicated, the insert diameter should be less than two-thirds and preferably one-half, or less, than that of the bushing.

The thermal stress is also minimized in the novel construction by providing a weldable flange 28 for insert 16, which, facilitates assembly to the component (not shown). Furthermore, an axially projected ring 36, adjacent the circumference of flange 28, provides a knife edge contact for resistance welding of the flange. This permits the making of a hermetic seal with a thermal input of short duration, and consequently, low stress of the bushing-insert seal.

Where hermetic sealing is unnecessary, the thermal input of this connection can be further reduced by substituting three, or more, conical weld projections for ring 36. This technique can be utilized, for example, for external connection to insert 14.

The weldable flange 28 is also provided at a short distance from the bushing to enhance welding of it and further reduce thermal stress of the terminal during the latter operation.

Many different modifications are possible, of course. Thus the weldable flange, having either a ring or point projections, can be employed for either or both inserts. When utilized on insert 14, it may provide connection to a washer and internal lead of the component, rather than soldering in recess 32; or to external circuitry, or both.

Of course, the terminal may also be employed as a stand-off, in which case no communicating passageway is necessary within the bushing. Furthermore, insert 14 may also employ female threads for attaching to external equipment.

Thus many different modifications of the invention are possible without departing from the spirit and scope thereof, and it should be understood that the invention is not to be limited except as in the appended claims.

What is claimed:
1. A high voltage terminal comprising a substantially cylindrical body of organic polymeric material having a pair of substantially cylindrical metal inserts disposed at opposite ends thereof and longitudinally spaced apart therein, each of said inserts having a diameter within said body which is small as compared to the adjacent body diameter so as to reduce stress resulting from non-uniform heating, said insert diameter being equal to or less than one-half that of the adjacent body diameter, at least one of said inserts being extended from said body and carrying a flange at the end thereof for weldably mounting said terminal to a casing, said flange having an axial projection thereon to enhance the welding thereof, and an insulative sleeve inside the insert carrying said flange.

References Cited

UNITED STATES PATENTS

| 1,850,105 | 3/1932 | Higginbottom | 317—260 |
| 3,137,808 | 6/1964 | Coda et al. | 317—261 X |
| 2,726,280 | 12/1955 | Demourjian | 174—166 |
| 3,105,870 | 10/1963 | Raila et al. | 174—177 |
| 3,144,501 | 8/1964 | Diebold | 174—85 |
| 3,255,298 | 6/1966 | Meyer | 174—187 |

FOREIGN PATENTS

| 859,765 | 12/1952 | Germany. |
| 509,169 | 7/1939 | Great Britain. |
| 236,471 | 7/1945 | Switzerland. |

OTHER REFERENCES

Comer et al, Electrical Manufacturing, "Applying Glass-to-Metal Seals," vol. 62 No. 2, August 1958, pp. 102–107. Copy in 174–50.61.

German printed application No. 1,074,689, published Feb. 4, 1960.

LARAMIE E. ASKIN, *Primary Examiner.*